United States Patent
Wang et al.

(10) Patent No.: US 11,580,425 B2
(45) Date of Patent: Feb. 14, 2023

(54) MANAGING DEFECTS IN A MODEL TRAINING PIPELINE USING SYNTHETIC DATA SETS ASSOCIATED WITH DEFECT TYPES

(71) Applicant: Microsoft Technology Licensing, LLC, Redmond, WA (US)

(72) Inventors: Shoou-Jiun Wang, Sammamish, WA (US); Xing Zhang, Bothell, WA (US); Eslam K. Abdelreheem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 16/917,769

(22) Filed: Jun. 30, 2020

(65) Prior Publication Data
US 2021/0406727 A1    Dec. 30, 2021

(51) Int. Cl.
*G06F 21/00* (2013.01)
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 9,218,390 B2 * | 12/2015 | Feng | ................... G06F 16/9537 |
| 10,268,753 B2 | 4/2019 | Bar-Or et al. | |
| 2014/0101090 A1 | 4/2014 | Gordon et al. | |
| 2019/0220776 A1 | 7/2019 | Huang et al. | |
| 2019/0318755 A1 | 10/2019 | Tashev et al. | |
| 2020/0012935 A1 * | 1/2020 | Goodsitt | ................... G06N 7/00 |
| 2020/0050968 A1 | 2/2020 | Lee et al. | |

(Continued)

FOREIGN PATENT DOCUMENTS

WO    WO-2020123985 A1 *    6/2020    ......... G06F 16/9038

OTHER PUBLICATIONS

Camara, et al., "Robustness-Driven Resilience Evaluation of Self-Adaptive Software Systems", In Journal of IEEE Transactions on Dependable and Secure Computing, vol. 14, Issue 1, Jan. 2017, pp. 50-64.

(Continued)

*Primary Examiner* — Don G Zhao

(57) ABSTRACT

The disclosure herein describes managing defects in a model training pipeline. A synthetic data set is generated that is associated with a defect type and a lifecycle stage of the model training pipeline, and baseline performance metrics associated with the defect type are generated. Based on a code change to the pipeline, a test model is trained using the pipeline and the synthetic data set, and test performance metrics are collected based on the test model and associated with the defect type. Based on comparing the baseline performance metrics and the test performance metrics, a defect of a particular defect type is identified in the pipeline. An indicator of the defect is provided that includes the defect type and the lifecycle stage with which the synthetic data set is associated, whereby a defect correction process is enabled to remedy the defect based on the associated defect type and the lifecycle stage.

20 Claims, 6 Drawing Sheets

(56) References Cited

U.S. PATENT DOCUMENTS

| | | | |
|---|---|---|---|
| 2020/0193313 A1* | 6/2020 | Ghanta | G06F 16/9038 |
| 2020/0265273 A1* | 8/2020 | Wei | G06N 3/084 |
| 2020/0387836 A1* | 12/2020 | Nasr-Azadani | G06N 20/20 |
| 2021/0028973 A1* | 1/2021 | Cote | G06K 9/627 |
| 2021/0192394 A1* | 6/2021 | McKay | G06N 20/00 |
| 2021/0208545 A1* | 7/2021 | Zhang | G06N 5/04 |
| 2021/0312307 A1* | 10/2021 | Hazard | G06N 5/022 |
| 2021/0326652 A1* | 10/2021 | Hazard | G06V 10/761 |
| 2021/0390455 A1* | 12/2021 | Schierz | G06N 5/04 |
| 2021/0406722 A1* | 12/2021 | Armstrong-Crews | G06N 20/00 |

OTHER PUBLICATIONS

Li, et al., "Discriminative Data-driven Self-adaptive Fraud Control Decision System with Incomplete Information", In Repository of arXiv:1810.01982v2, Jul. 27, 2019, 30 Pages.

Meyer, et al., "An Analytics-Based Method for Performance Anomaly Classification in Cyber-Physical Systems", In Proceedings of the 35th Annual ACM Symposium on Applied Computing, vol. 8, Mar. 30, 2020, pp. 210-217.

"International Search Report & Written Opinion issued in PCT Application No. PCT/US21/029508", dated Aug. 9, 2021, 15 Pages.

Ertugrul, Omerf Faruk., "A Novel Approach for Extracting Ideal Exemplars by Clustering for Massive Time-Ordered Datasets", In Turkish Journal of Electrical Engineering and Computer Sciences, vol. 25, Issue 4, Jun. 30, 2017, pp. 2614-2634.

He, et al., "AutoML: a Survey of the State-of-the-Art", In Journal of Computing Research Repository, Aug. 2, 2019, 17 Pages.

Jiang, et al., "Fault Prediction using Early Lifecycle Data", In Proceedings of 18th IEEE International Symposium on Software Reliability, Nov. 5, 2007, pp. 237-246.

Mayer, et al., "What Makes Good Synthetic Training Data for Learning Disparity and Optical Flow Estimation?", In Journal of Computing Research Repository, Jan. 19, 2018, 23 Pages.

Pei, et al., "A Synthetic Data Generator for Clustering and Outlier Analysis", Retrieved From: https://era.library.ualberta.ca/items/63beb6a7-cc50-4ffd-990b-64723b1e4bf9/download/7a64d242-a5f1-4b32-805f-6878e267a0f1, Retrieved Date: May 18, 2020, 33 Pages.

Vartak, et al., "MODELDB: a System for Machine Learning Model Management", In Proceedings of the Workshop on Human-in-the-Loop Data Analytics, Jun. 26, 2016, 3 Pages.

\* cited by examiner

MANAGING DEFECTS IN A MODEL TRAINING PIPELINE USING SYNTHETIC DATA SETS ASSOCIATED WITH DEFECT TYPES

BACKGROUND

Machine learning-based models have become vital tools for many purposes, such as classifying data entries based on complex requirements, identifying patterns in very large data sets, processing image or video data to enable computer vision, and the like. Improving and automating the processes that are used to create and train such models are important areas that provide opportunities but that also present significant challenges. Much recent work on the subjects have focused on the selection of machine learning algorithms and tuning of parameters that are used in the processes. However, there are many different points in the model training lifecycle where changes can be introduced that result in degraded performance of the trained models, and are therefore considered defects. Identifying and correcting such defects requires significant time and manual effort by technicians, and increasing complexity of model training processes only increases the type and number of defects that may be introduced based on changes, further compounding the challenges of defect identification and correction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing defects in a model training pipeline is described. A synthetic data set is generated that is associated with a defect type and a lifecycle stage of the model training pipeline. In some examples, the synthetic data set is generated from a data set of real data. Using the synthetic data set, baseline performance metrics associated with the defect type are generated. Based on the introduction of a code change to the model training pipeline, a test model is trained using the pipeline and the synthetic data set and test performance metrics are collected based on the test model and associated with the defect type. Based on comparing the baseline performance metrics and the test performance metrics, a defect of the defect type is detected in the model training pipeline and an indicator of the detected defect is provided that includes the defect type of the defect and the lifecycle stage with which the synthetic data set is associated, whereby a defect correction process is enabled to remedy a defect of the defect type and the lifecycle stage.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
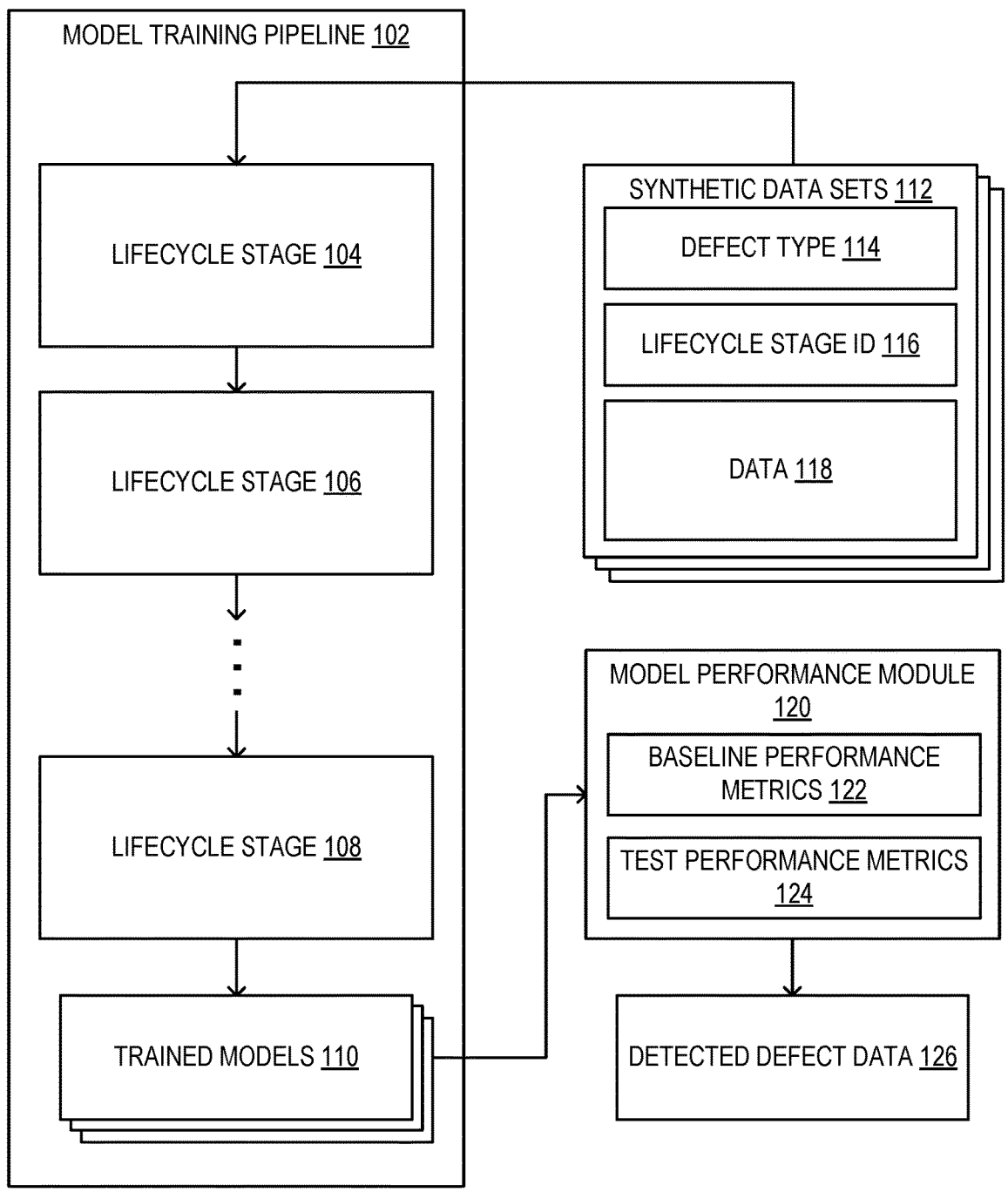
FIG. 1 is a block diagram illustrating a system configured as a model training pipeline for training models using machine learning, and detecting and managing defects in the training process according to an embodiment.

Aspects of the disclosure provide a computerized method and system for managing defects in a model training pipeline, including detection of potential defects in the pipeline and identification of defect types of the detected defects and lifecycle stages in which the detected defects may be located. The described method and system automatically identifies defects at each lifecycle stage (e.g., data preparation stages, featurization stages, sampling stages, training/validation stages, model selection stages, etc.). Training data sets are synthesized to include features or patterns that enable the detection of defects as described herein. In some examples, a synthetic data set is generated that is associated with a defect type and a lifecycle stage of the model training pipeline. Using the synthetic data set, baseline performance metrics associated with the defect type are generated from a model training pipeline that is performing properly. Based on the introduction of a code change to the model training pipeline, a test model is trained using the pipeline and the synthetic data set and test performance metrics are collected based on the test model and associated with the defect type. Based on comparing the baseline performance metrics and the test performance metrics, a defect may be identified in the model training pipeline based on degraded performance, and an indicator of the identified defect is provided that includes the defect type of the defect and the lifecycle stage with which the synthetic data set is associated, thus allowing a defect correction process to target (e.g., remedy) the defect type and the lifecycle stage.

The disclosure addresses the challenges that face users of a model training pipeline with respect to the detection and identification of defects that may occur as the pipeline undergoes changes (e.g., code changes). The provided defect indicators enable a user of such a system to target their efforts on specific lifecycle stages of the pipeline, and on finding specific types of defects therein. This significantly reduces the time and effort that user may expend when looking for defects throughout the entire pipeline with little or no initial knowledge as to what type of defect to look for, or which stage to look in. The disclosure enables the quick identification of root causes of defects in the end-to-end process of the pipeline. Further, the described systems and methods are flexible in that, to enable the system to identify a new type of defect, a user may simply include an associated new type of synthetic data set, such that the described process is performed to include the new synthetic data set.

The described system is thus scalable and extensible. Defects of the new type will be detected based on the performance of models that are trained using the new synthetic data set. Additionally, by detecting defects as described, significant additional engineering efforts may be reduced or avoided entirely, such as manually analyzing large quantities of telemetry data and, in some cases, introducing code changes that must be made to the pipeline to collect additional information about potential defects. The disclosure operates in an unconventional way by relying on the use of unique synthetic data sets that are configured to zero in on specific types of defects that may be introduced into the pipeline. Using customized, targeted synthetic data sets in this provides for a modular and flexible solution that reduces time and effort required of users to identify and correct for defects in a pipeline, as well as enabling automation of the process to a greater degree, because much of the described method involves executing the model training pipeline to obtain trained models and associated performance metrics. The reduction in effort required to detect and correct defects is further reflected in a reduction of the number or quantity of code changes to the pipeline that may otherwise be necessary for debugging potential defects, thereby reducing the quantity of versions of pipeline software and computing resource usage associated therewith.

FIG. 1 is a block diagram illustrating a system 100 configured as a model training pipeline 102 for training models (e.g., trained model 110) using machine learning, and detecting and managing defects in the training process (e.g., training lifecycle stages 104-108) according to an embodiment. The model training pipeline 102 includes hardware, firmware, and/or software configured for performing machine learning operations based on sets of training data (e.g., synthetic data sets 112) to generate trained models 110. Further, the system 100 is configured to gather performance metrics (e.g., baseline performance metrics 122 and test performance metrics 124) via a model performance module 120 and, using the performance metrics, identify or determine potential defects (e.g., states or elements of operations and/or components of the model training pipeline 102 that result in degraded model performance) that may exist in the configuration of the current training process. In some examples, the model training pipeline 102 and associated components of system 100 are implemented and/or executed on one or more computing devices (e.g., a single server device or a distributed network of server devices).

The training process implemented by the model training pipeline 102 includes a plurality of lifecycle stages 104-108 which are configured to perform different types of operations using training data, such as synthetic data sets 112, to prepare to train and/or to train the trained models 110. In some examples, each synthetic data set 112 is used to train a separate trained model 110 as described herein and each separate training process may be performed serially, in parallel, or some combination of the two. Each lifecycle stage 104, 106, and/or 108 may be configured to perform configuration operations on a model prior to training, process data of the training data sets in preparation for training, and/or perform actual training processes on a model using training data to generate the trained model 110. Lifecycle stages 104-108 may include data quality/preparation stages, featurization stages, data sampling stages, train/test split stages, and/or model algorithm selection/training stages. These specific lifecycle stages are described in greater detail below with respect to FIG. 2, but it should be understood that, in other examples, more, fewer, or different lifecycle stages may be used in a model training pipeline without departing from the description.

The model training pipeline 102 further includes or otherwise makes use of one or more synthetic data sets 112. Each synthetic data set 112 is associated with a defect type 114 identifying a type of training defect or defects that the data set 112 is configured to bring to light, evoke, prompt, or the like, in the model. Each synthetic data set 112 is designed to stress test the model in a different way. For instance, if a particular type of training defect is known to affect performance of a trained model the most (e.g., significantly, noticeably, or otherwise) when the training data includes data values that exceed a particular (e.g., extreme) threshold, the synthetic data set 112 associated with that type of training defect may include more data values that exceed the threshold than would typically be in an average data set. The design goal of that synthetic data set 112 is to push the limits of the model. Further, each synthetic data set 112 may be associated with a lifecycle stage identifier, or ID, 116 that identifies the lifecycle stage of the training process that is affected by, or most affected by, the defect of the associated defect type 114. The lifecycle stage ID 116 of a synthetic data set 112 may be used to identify which lifecycle stage or stages may contain or otherwise include defects detected based on the synthetic data set 112. The synthetic data sets 112 each include data 118 that is configured to be used during the model training process to train trained models 110 associated with the synthetic data sets 112. The data 118 may be model training data that is based on a real data set or data sets and transformed or otherwise converted to synthetic data as described herein.

In some examples, the synthetic data sets 112 are designed, defined, and/or generated to include sets of data that have patterns configured to induce defects of associated defect types 114 when a model is being trained, or during operation of a trained model 110 after it has been trained. Such data patterns of the synthetic data sets 112 may be configured to be extreme in, or otherwise focus on, one or more aspects of real-world data to the extent that the patterns in the synthetic data sets 112 may be unlikely to occur in real-world data sets. However, such extreme or focused aspects, patterns, or features in the synthetic data sets 112 are configured to result in the appearance or presence of defects of the associated defect types, which are made apparent based on the performance of the model training pipeline 102 and associated trained models 110 as described herein.

The model training pipeline 102 is configured to use each of the synthetic data sets 112 as input to generate and train a trained model 110 associated with the synthetic data set 112 used as input. As a result, each trained model 110 that is trained based on a synthetic data set 112 is associated with the defect type 114 and/or the lifecycle stage ID 116 of the synthetic data set 112, and performance metrics gathered from the trained model 110 are used to detect defects of the defect type 114 as described herein.

In some examples, the synthetic data sets 112 are generated based on real-world data that has been transformed in some way to exhibit data patterns associated with the defect types 114 of the synthetic data sets 112 as described herein. Further, multiple real-world data sets may be used in the creation and/or generation of the synthetic data sets 112 such that there are multiple synthetic data sets 112 for each defect type 114 with one synthetic data set 112 being based on each of the real-world data sets (e.g., for real-world data sets A, B, and C, synthetic data sets A1, B1, and C2 may be generated in association with a first defect type, and synthetic data sets A2, B2, and C2 may be generated in association with a second defect type, etc.). This is described in greater detail below with respect to FIG. 3.

Alternatively, or additionally, a synthetic data set 112 may be configured to be associated with more than one defect type 114 such that training a trained model 110 based on the synthetic data set 112 and collecting performance metrics 124 from the trained model 110 as described herein may enable the detection of at least one defect associated with at least one defect type 114 with which the synthetic data set 112 is associated. For instance, a trained model 110 trained using a synthetic data set 112 that is configured to be associated with a defect type A and a defect type B may be used to detect the presence of one or more defects of type A and/or one or more defects of type B. However, in such examples, it may be difficult or impossible to determine precisely whether a detected defect is of type A or type B without further testing and/or analysis of the model training pipeline 102.

In some examples, model training pipeline 102 is configured to train models 110 in a model training stage that are neural networks or the like. The trained models 110 may include one or more the following neural network types without departing from the description herein: an optimized maximum mean discrepancy networks, noise contrastive estimation networks, mixture density networks, neural autoregressive distribution estimators, real-valued neural autoregressive distribution estimators, diffusion process models, variational autoencoders, generative adversarial networks. In other examples, the model training pipeline 102 may be configured to train the models 110 as other types of models trained using machine learning techniques without departing from the description (e.g., decision trees, support vector machines, regression analysis models, Bayesian networks, and/or genetic algorithm models). Further, the model training pipeline 102 may be configured to train the models 110 using one or more types of machine learning algorithms, such as supervised learning algorithms, unsupervised learning algorithms, semi-supervised learning algorithms, reinforcement learning algorithms, self-learning algorithms, feature learning algorithms, sparse dictionary learning algorithms, anomaly detection algorithms, robot learning algorithms, and/or association rules algorithms. In other examples, the model training pipeline 102 may be configured to use different types of machine learning algorithms without departing from the description herein.

The system 100 includes a model performance module 120. The model performance module 120 includes hardware, firmware, and/or software configured for collecting performance metrics, such as baseline performance metrics 122 and test performance metrics 124, associated with the model training process and the lifecycle stages 104-108 thereof. The performance metrics collected by the model performance module 120 may be metrics based on the performance of operations at each of the lifecycle stages 104-108 and/or performance of operations of a trained model 110 after it is trained by the model training pipeline 102. For instance, in some examples, performance metrics measuring the accuracy with which the trained model 110 classifies input data may be collected by the model performance module 120 after the trained model 110 is trained by the model training pipeline 102. Additionally, or alternatively, performance metrics of specific lifecycle stages or operations associated with the lifecycle stages may be measured, such as time taken to complete an operation of a lifecycle stage.

In some examples, the model performance module 120 in combination with the synthetic data sets 112 is configured to identify defects that are introduced to the training process of the model training pipeline 102 based on changes made to one or more lifecycle stages 104-108 of the model training pipeline 102 (e.g., code changes and/or configuration changes that affect the operations performed during the stages). To identify such introduced defects, the model performance module 120 is further configured to compare the baseline performance metrics 122, which are obtained from analysis of a baseline training process configuration and/or a trained model 110 that is trained using the baseline training process, and test performance metrics 124, which are obtained from analysis of a changed training process configuration and/or a trained model 110 that is trained using the changed training process. A baseline version of the training process and/or associated lifecycle stages may be established by using a training process configuration and/or suitable machine learning algorithms that are known to yield acceptable or optimal performance. Models are trained using the baseline version of the training process and each of the synthetic data sets 112, and the baseline performance metrics 122 are collected by the model performance module 120. The baseline performance metrics 122 are stored in or otherwise in association with the model performance module 120 to be used in comparison with other performance metrics in the identification of introduced defects as described herein.

When changes are made to the training process of the model training pipeline 102 (e.g., configuration changes or changes to a machine learning algorithm), the changed training process, or test training process, is used to train trained models 110, and test performance metrics 124 may be gathered from the test training process and/or the trained models 110 trained therewith. The test performance metrics 124 that are collected are the same set of metrics as those in the baseline performance metrics 122, such that each metric associated with the test training process may be compared to an equivalent metric associated with the baseline training process. Further, in some examples, the metrics 122 and 124 include individual metrics or subsets of metrics that are associated with each defect type 114 of the synthetic data sets 112, wherein a metric or a subset of metrics associated with a particular defect type 114 is substantially affected by that type of defect and, therefore, indicative of the presence of a defect of that type when the metric or subset of metrics differ substantially from the baseline performance metrics 122. For instance, the baseline performance metrics 122 may include performance metrics collected from trained models trained by the baseline version of the model training pipeline 102 using each of the synthetic data sets 112 and, similarly, the test performance metrics 124 include performance metrics collected from trained models trained by the test version of the model training pipeline 102, or test models, using each of the synthetic data sets 112.

In some examples, the model performance module 120 is configured to detect types of defects by comparing the metrics associated with each defect type in the baseline performance metrics 122 to the equivalent metrics in the test performance metrics 124. If the differences between metrics of the baseline performance metrics 122 and the equivalent metrics of the test performance metrics 124 exceed defined thresholds or threshold values, the differences are considered indicative of the presence of a defect of the defect type with which the compared metrics are associated. For instance, if the baseline performance metrics 122 indicate a baseline model accuracy percentage of 90% (e.g., the trained models may be trained to classify, sort, or otherwise make predictions about entries in a data set, such as classifying transactions in a transaction data set or identifying objects in a video data stream), the test performance metrics 124 indicate a test model accuracy percentage of 82%, and the defined threshold is a 5% difference, a result of the difference between the model accuracy percentages exceeding 5% is an indication that a defect of the associated defect type is present in the test version of the pipeline with which the test model was trained. An indicator of that defect type may be output by the model performance module 120 as detected defect data 126. In some examples, the subsets of metrics with which a defect type is associated and associated thresholds of those metrics that are indicative of the presence of such a defect are defined and stored for each defect type. Additionally, or alternatively, metrics of subsets of metrics may be associated with specific lifecycle stages. For instance, if a particular defect type can occur in two different lifecycle stages of the process and different metrics or subsets of metrics are indicative of that type of defect in the two different stages, the baseline performance metrics and test performance metrics associated with the defect type in a first lifecycle stage are compared and the baseline performance metrics and test performance metrics associated with the defect type in second lifecycle stage are compared, such that the presence of such a defect in the first lifecycle stage and/or the second lifecycle stage may be identified independently and indicated in the detected defect data 126.

In further examples, the evaluation of differences between baseline performance metrics 122 and test performance metrics 124 with respect to identifying and indicating the presence of defects of particular types and/or at particular stages of the model training pipeline 102 may be based on multiple thresholds between multiple sets of metrics and/or other evaluation methods, such as conditional expressions that compare a subset of metrics using defined thresholds and logical operators, such as 'AND' and 'OR, and/or nested evaluations. For instance, in an example, a defect of a type is indicated based on three different metric data values. If a difference 'A' between the first metric data values is equal to or greater than a threshold value 'X', a defect is indicated. Alternatively, if a difference 'B' between the second metric data values is equal to or greater than a threshold value 'Y' and a difference 'C' between the third metric data values is equal to or greater than a threshold value 'Z', a defect is indicated. So, the evaluation of the differences between metrics for identifying the defect may be performed according to this expression: A>=X OR (B>=Y AND C>=Z). In other examples, different expressions may be used to evaluate comparisons of metrics to identify the presence of defects without departing from the description.

The model performance module 120 may be configured to evaluate the differences between metrics associated with each defect type and to provide detected defect data 126 as output for each type of defect that is detected based on those evaluations. The detected defect data 126 may include indications or indicators of one or more defect types and/or lifecycle stage IDs associated with lifecycle stages in which those detected defects may be present. Further, the detected defect data 126 may be configured to include information about the metric data values that specifically indicated the presence of a defect, such that a user that observes the detected defect data 126 may be enabled to better determine the cause of the defect in some cases.

Figure 2:
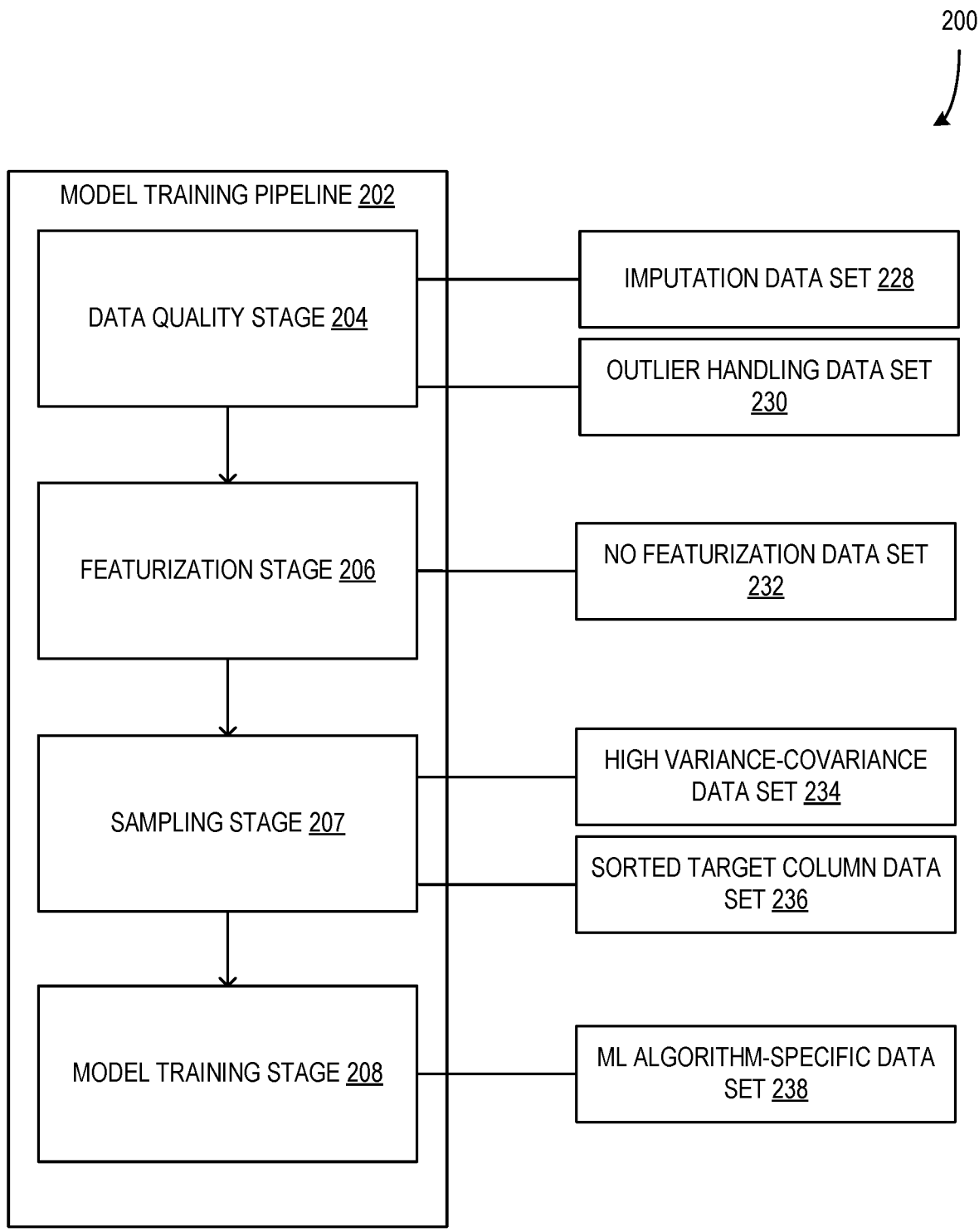
FIG. 2 is a block diagram illustrating a system configured as a model training pipeline for training models using machine learning, and including a set of lifecycle stages and associated synthetic data sets according to an embodiment.

FIG. 2 is a block diagram illustrating a system 200 configured as a model training pipeline 202 for training models using machine learning and including a set of lifecycle stages 204-208 and associated synthetic data sets 228-238 according to an embodiment. In some examples, the system 200 is further configured in substantially the same way as system 100 of FIG. 1 described above, but with the specific lifecycle stages 204-208 and specific types of synthetic data sets 228-238 as described. The lifecycle stages of the model training pipeline 202 include a data quality stage 204, a featurization stage 206, a sampling stage 207, and a model training stage 208. In other examples, the lifecycle stages may include more, fewer, or different stages without departing from the description herein.

The types of synthetic data sets of the model training pipeline 202 include imputation data sets 228, outlier handling data sets 230, no featurization data sets 232, high variance-covariance data sets 234, sorted target column data sets 236, and machine learning (ML) algorithm-specific data sets 238. In other examples, the types of synthetic data sets may include more, fewer, or different types of data sets without departing from the description herein.

As illustrated in FIG. 2, lifecycle stages of the model training pipeline 202 are associated with types of synthetic data sets, indicating that models trained using a type of synthetic data set associated with a lifecycle stage are used to test for defects in that lifecycle stage as described herein. For instance, the data quality stage 204 is associated with imputation data sets 228 and outlier handling data sets 230. When models are trained by the model training pipeline 202 using either imputation data sets 228 or outlier handling data sets 230, the performance metrics of those trained models may be used to detect defects of those types that may have been introduced into the data quality stage 204.

In some examples, in the data quality stage 204, or data preparation stage, the training data set (e.g., synthetic data set 112) is analyzed and processed to improve or otherwise adjust the quality of the data that is used in the rest of the model training lifecycle. Such processing may include imputing data in the data set based on data that is already present and/or dropping columns from the data set that may be of low quality and/or empty. In order to test for defects in the data quality stage, imputation data sets 228 are generated, which have some columns with low/medium/high missing rates and missing rates that are the same and/or different among target column classes, which may induce classification problems. Additionally, or alternatively, the data value may be generated which have uniformly or non-evenly distributed high values and/or low values in target columns of the data sets, which may highlight defects in the data quality stage 204 if they are not handled properly. When performance metrics of models trained with these synthetic data sets are below baseline metrics, it implies the modeling process has defects in imputation, or defects of an imputation defect type.

Outlier handling data sets 230 are generated to have some columns with high and/or low value outliers. For regression cases, target columns may also be manipulated with a smaller portion of extreme high and/or low values. When performance metrics of models trained with outlier handling data sets 230 are below baseline metrics, it implies that the modeling process has defects on handling outlier data values, or defects of an outlier handling defect type.

In some examples, a featurization stage 206 is used during the modeling process to configure features of the training data set which significantly improve model performance, and baseline metrics may be obtained based on models that are trained using data sets that contain such features. To test the featurization stage, no featurization data sets 232 may be generated that do not contain any of those features initially. Models trained based on the no featurization data sets 232 may be analyzed to collect associated test performance metrics and, if those metrics are below the baseline metrics, it implies that the modeling process has defects around the featurization of the training data, or defects of a featurization defect type.

In some examples, a sampling stage 207 is used to process the training data prior to the model training stage 208. When a data set is very large, it is not necessary to train the model using all the data in the data set. Instead, during the sampling stage 207, a random sample of the data set is selected for use in training, reducing the time and capacity used during the training process. Verifying the sampling process is valid may include stratifying the sampling based on target columns of the data set, which results in the sample's target column distribution being the same as that of the entire data set. In such cases, two defects may result. First, when the predictors are highly skewed, a smaller sample may not represent the data set accurately (e.g., defects of a skewed predictor defect type) and, second, the sample stratification process may be implemented incorrectly which may result in a distribution of the target column that is different from that of the entire data set (e.g., defects of a stratified sample defect type). To identify the first problem, high variance-covariance data sets 234 may be used which are data sets in which very high values are used for the variance-covariance matrix. To identify the second problem, sorted target column data sets 236 may be used, which include data that is sorted by target columns in various formats. In some instances, some sampling algorithms do not handle data sets sorted in special patterns in an accurate manner, so using such sorting in the training data set may enable such issues to be detected as described herein.

At the model training stage 208, ML algorithm-specific data sets 238 may be used to detect defects at this stage. In some examples, it is known what sorts of features or patterns of data will result in the best performance of the algorithm(s) being used to train the models at the model training stage 208. The data sets 238 are generated in such a way as to exhibit those known features or patterns and baseline metrics are obtained by training models on those data sets 238 using a baseline version of the pipeline 202. Then, when models are trained using a test version of the pipeline 202 and the ML algorithm-specific data sets 238, significant discrepancies in the performance metrics may imply the presence of a ML algorithm-specific defect in the model training stage 208.

Further, other stages and/or types of data sets may also be used without departing from the description. For instance, a training/validation split stage between the sampling stage 207 and the model training stage 208 may be incorporated. In such a stage, a common mistake is that the splitting is not completely random. Such a defect may be identified in a similar manner to the sorted target column data set 236 associated with the sampling stage 207 as described above. Additionally, or alternatively, such defects may be identified when the performance metrics between training and validation data sets differ significantly. With such further analysis, defects caused by the sampling stage 207, the splitting stage, or sample size may be differentiated.

Figure 3:
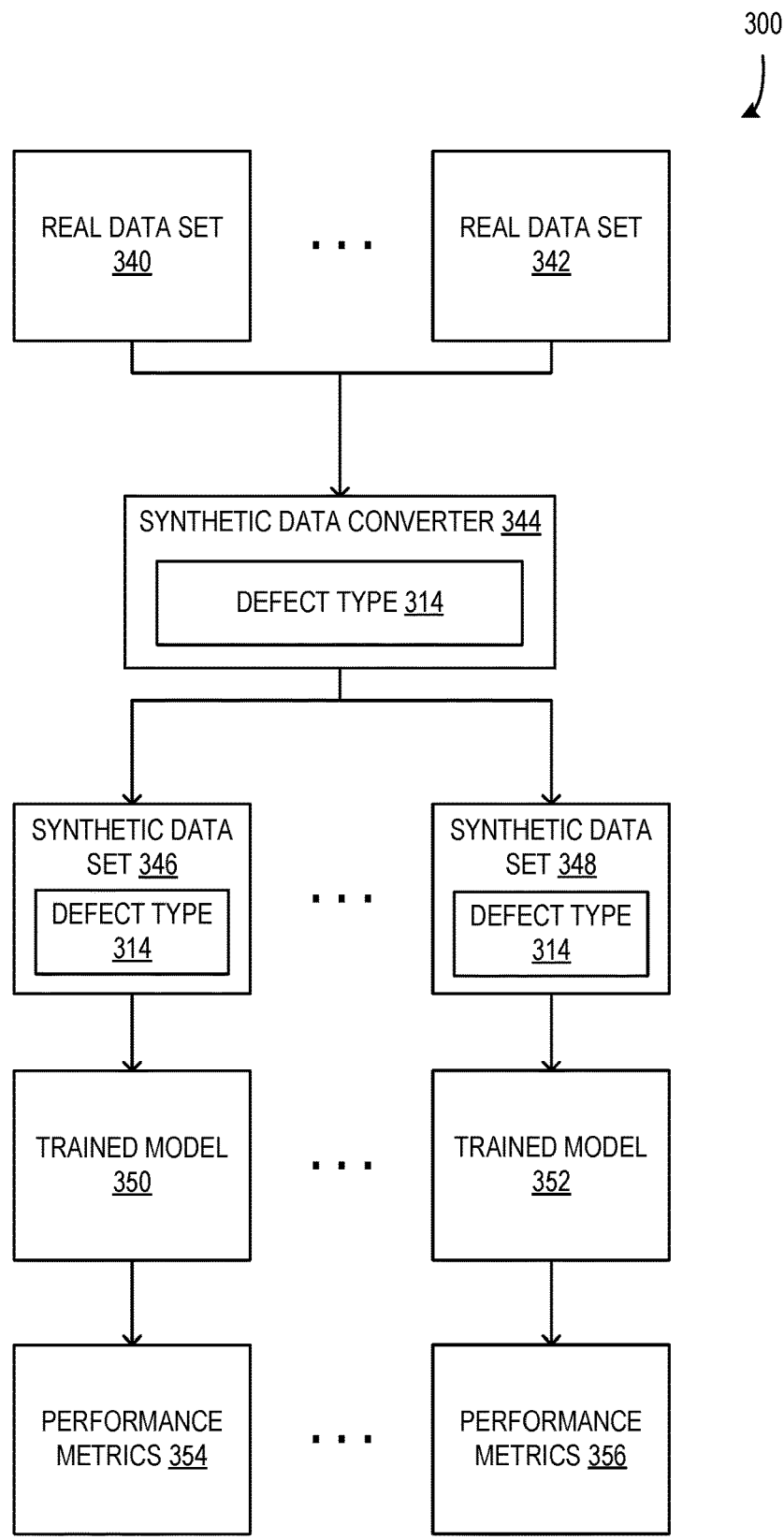
FIG. 3 is a block diagram illustrating a system for converting real data sets to synthetic data sets associated with a defect type according to an embodiment.

FIG. 3 is a block diagram illustrating a system 300 for converting real data sets 340-342 to synthetic data sets 346-348 associated with a defect type 314 according to an embodiment. In some examples, the system 300 may be implemented as part of a system such as systems 100 and 200 of FIGS. 1 and 2, respectively. The real data sets 340-342 are configured to include data collected based on real-world events, occurrences, statistics, or the like. For instance, the real data sets 340-342 may include real-world video stream data collected from cameras over periods of time. Because the real data sets 340-342 are not designed or otherwise curated, they may or may not exhibit data patterns or features that are of use in provoking performance degradation to help detect and identify defects in model training pipeline (e.g., pipelines 102, 202) as described herein.

To generate synthetic data sets 346-348 that include patterns or features that are associated with defects of defect type 314, the real data sets 340-342 are converted or otherwise transformed using a synthetic data converter 344. In some examples, the synthetic data converter 344 is configured to perform one or more operations on each data set of the real data sets 340-342 to generate synthetic data sets 346-348 which are based on the real data sets 340-342 respectively. For instance, the synthetic data converter 344 may be configured to generate synthetic data sets 346-348 that have greater than average numbers of extremely large data values (e.g., the defect type 314 associated with the synthetic data converter 344 is more detectable in models trained on data sets that have such a pattern). The conversion or transformation performed by the synthetic data converter 344 to generate the synthetic data sets 346-348 may include adjusting data values, deleting data value, introducing new data values, sorting data rows and/or columns, changing text fields of data rows, etc. The synthetic data sets 346-348 that result from the conversion are associated with the defect type 314 of the synthetic data converter 344.

The synthetic data sets 346-348 are used as training data in a model training pipeline (e.g., pipelines 102, 202) to generate and train trained models 350-352, with one trained model being generated per synthetic data set 346-348. Performance metrics 354-356 may then be collected from the respective trained models 350-352, such that there is a set of performance metrics for each trained model 350-352. The performance metrics 354-356 may be used as baseline performance metrics if the trained models were generated by a baseline version of the model training pipeline, or they may be used as test performance metrics if the trained models were generated by a test version of the model training pipeline.

In some examples, multiple synthetic data sets generated from equivalent real data sets may be used to test for a specific defect type 314, reducing or eliminating the chance of the testing being rendered ineffective by using a data set that inadvertently includes patterns or features that harm the accuracy of the test. Further, the real data sets 340-342 may be converted into synthetic data sets associated with other defect types using associated synthetic data converters, such that there is a synthetic data set for each combination of a real data set of data sets 340-342 and a defect type of the set of possible defect types. Each of these synthetic data sets may be used to generate trained models and those models may be evaluated to detect the presence of any of the defect types as described herein (e.g., baseline performance metrics of a model trained using a baseline version of the pipeline are compared to test performance metrics of a model trained using a test version of the pipeline for each synthetic data set). In an example where there are four real data sets A, B, C, and D and four synthetic converters associated with four different defect types 1, 2, 3, and 4, sixteen synthetic data sets may be generated therefrom. For instance, if a synthetic data set is denoted by the combination of the letter of the real data set on which it is based and the number of the defect type for which it is configured, the sixteen synthetic data sets include A1, A2, A3, A4, B1, B2, B3, B4, C1, C2, C3, C4, D1, D2, D3, and D4.

Figure 4:
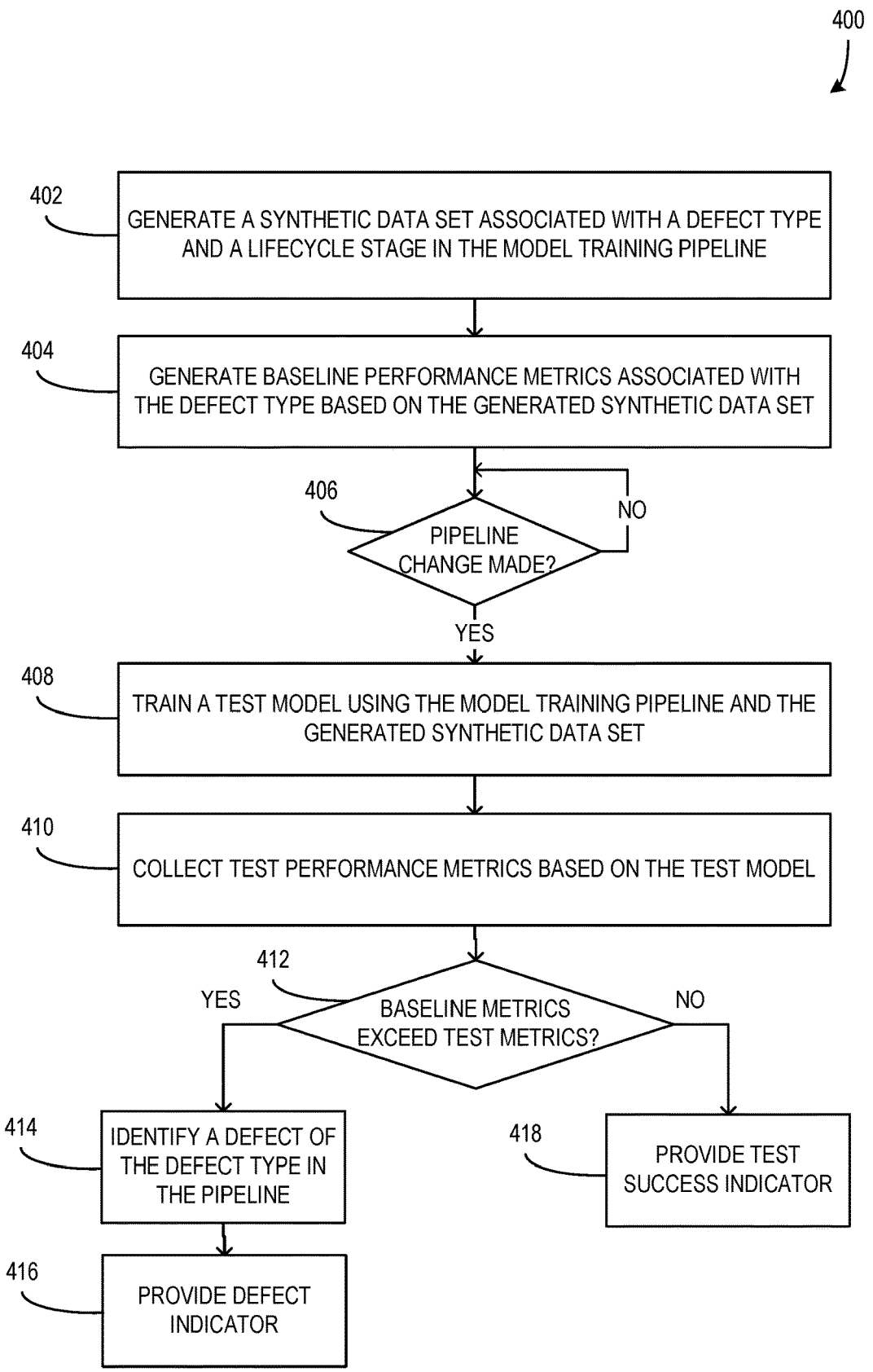
FIG. 4 is a flow chart illustrating a computerized method for managing a defect of a defect type in a model training pipeline according to an embodiment.

FIG. 4 is a flow chart illustrating a computerized method 400 for managing a defect of a defect type in a model training pipeline according to an embodiment. In some examples, the method 400 is performed or otherwise executed by a component or components of a system such as systems 100 and 200 of FIGS. 1 and 2, respectively. At 402, a synthetic data set associated with the defect type is generated. The synthetic data set may also be associated with a lifecycle stage of the model training pipeline, wherein the associated stage is a stage in which a defect of the defect type may be located. The synthetic data set is configured to include data patterns or features that, when used to train a model, cause the model to degrade in performance if a defect of the defect type is present in the model training pipeline. Further, in some examples, the synthetic data set may be generated based on a real data set that is transformed to include such data patterns or features, as described herein.

At 404, baseline performance metrics associated with the defect type are generated based on the synthetic data set. In some examples, generating the baseline performance metrics includes training a baseline model, which is a trained model (e.g., trained model 110) trained using a baseline version of the model training pipeline, using the synthetic data set as training data. The baseline performance metrics may be collected based on the performance of the trained model (e.g., a model performance accuracy value, such as a percentage of correctly classified data entries by the model). More, fewer, or different types of performance metrics may also be collected without departing from the description, such as time-based metrics associated with how quickly the model performs operations or lengths of time taken to perform training operations by the various stages of the model training pipeline.

At 406, if a change is made to the pipeline, the process proceeds to 408. Alternatively, if no change is made to the pipeline from the baseline version, the process may be configured to wait until a change is made later. Changes to the pipeline include code changes to the software of one or more lifecycle stages of the pipeline (e.g., changes to program code that alters how operations of the pipeline software are performed) and/or configuration changes to one or more lifecycle stages of the pipeline (e.g., changes to configurations, settings, or other states of the pipeline that are configured to be alterable or otherwise adjustable). In some examples, changes made to the pipeline may be detected and the process may proceed to 408 automatically as a result. Alternatively, or additionally, a user that makes a change to the pipeline may manually trigger the process to proceed to 408 based on the change.

At 408, a test model is trained using the model training pipeline (including the changes detected or otherwise identified at 406) and the synthetic data set. In some examples, training the test model is performed in substantially the same manner as training the baseline model as described above, with the only difference being the change made to the model training pipeline. In this way, the change is isolated by the described process such that any detected change to the performance metrics may be considered to be a result of the change made.

At 410, test performance metrics are collected based on the test model. As with the baseline model described above, the test performance metrics may be based on the accuracy of the performance of the model after it is trained and/or based on the performance of various operations of the pipeline during the training of the test model. The test performance metrics include the same types of metric values as the baseline performance metrics, such that the metric values of each set of metrics may be directly compared.

At 412, the baseline performance metrics are compared to the test performance metrics. If the baseline performance metrics exceed the test performance metrics, or otherwise indicate that the test model performance has degraded from the baseline model performance, the process proceeds to 414. Alternatively, if the baseline performance metrics are substantially the same as the test performance metrics or the test performance metrics indicate a better performance by the test model than the baseline model, the process proceeds to 418. In some examples, the comparison of the baseline metrics to the test metrics includes determining the difference between a baseline metric value and a test metric value and comparing the difference to a defined threshold, such that, if the test metric value is below the baseline metric value by more than the defined threshold, the detection of a defect is indicated and the process proceeds to 414. For instance, if the baseline performance metrics indicate a model that is 95% accurate at classifying a set of data entries and the test performance metrics indicate a model that is 85% accurate at classifying the set of data entries and the defined threshold is 5%, the comparison indicates that a defect of the associated defect type has been introduced to the pipeline by the associated change thereto.

At 414, based on the comparison at 412, a defect of the defect type is identified in the pipeline. Further, the associated lifecycle stage of the synthetic data set may be identified as a stage in which the defect is detected, based on the particular synthetic data set. At 416, an indicator of the detected defect is provided. The defect indicator may be provided to another component of the system, to a user interface for viewing by a user, to a storage component for storage thereon, or the like. The defect indicator may include the defect type of the detected defect, the associated lifecycle stage of the detected defect, and any other associated data that may be of use in addressing the defect. Further, the specific values and types of the compared performance metrics that triggered the detection of the defect may be provided for additional context. In some examples, the provided defect indicator may be displayed in a graphical user interface (GUI) for viewing by a user, whereby the user is enabled to take action to correct and/or remedy the defect by rolling the pipeline back to the baseline version and/or performing analyses of recent code changes and/or configuration changes of the indicated lifecycle stage to identify the cause of the detected defect.

At 418, if the test metrics do not indicate a significant degrading from the baseline metrics, a test success indicator is provided to another component of the system and/or an interface for viewing by a user, as described above with respect to providing the defect indicator at 416. Additionally, or alternatively, if the comparison of the metrics indicates that the test model has improved performance over the baseline model, the associated change to the pipeline may be considered an improvement of the pipeline and the provided test success indicator may include a recommendation that the change be considered the new baseline version of the pipeline, such that the baseline version is improved. In addition to providing such a recommendation, the system may be configured to automatically update or configure the baseline version of the pipeline and the associated baseline performance metrics to reflect the improvement of the pipeline.

Figure 5:
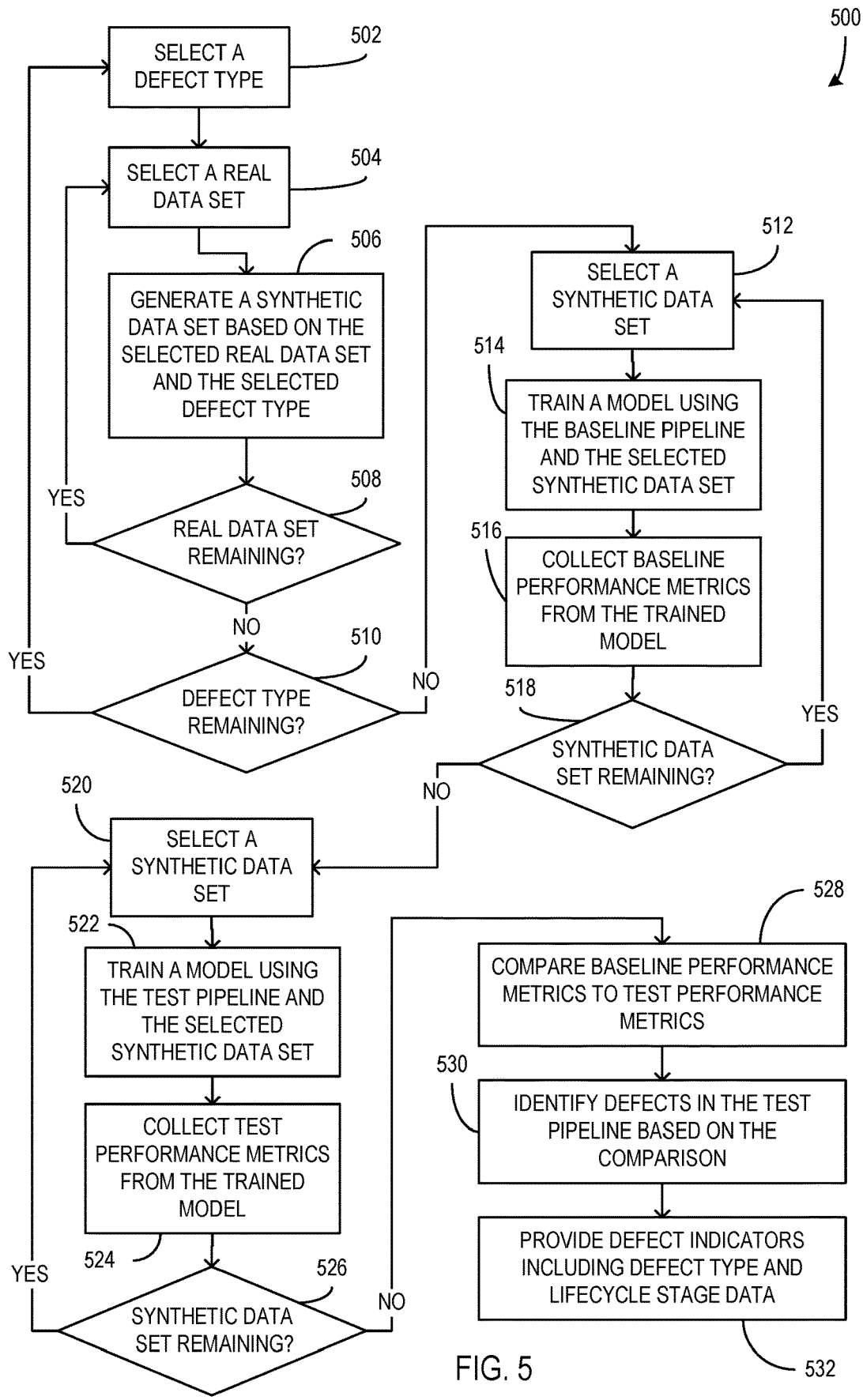
FIG. 5 is a flow chart illustrating a computerized method for managing defects of a plurality of defect types in a model training pipeline, including generation of synthetic data sets from real data sets for defect detection, according to an embodiment.

FIG. 5 is a flow chart illustrating a computerized method 500 for managing defects of a plurality of defect types in a model training pipeline, including generation of synthetic data sets from real data sets for defect detection, according to an embodiment. In some examples, the method 500 is performed or otherwise executed by a component or components of a system such as systems 100 and 200 of FIGS. 1 and 2 respectively, as described herein. Further, the method 500 may be performed in substantially the same manner as the method 400 described above but including sets of multiple defect types and associated synthetic data sets. At 502, a defect type is selected from a plurality of defect types that have been defined. In some examples, each defect type is defined by a user of the system in configuring the system, and the defect types may be defined based on the knowledge of the user and/or analysis of past trained model performance metrics. At 504, a real data set is selected from a plurality of real data sets that have been collected. At 506, a synthetic data set based on the selected real data set and the selected defect type is generated. The generated synthetic data set is associated with the selected defect type and the selected real data set and, in some examples, the synthetic data set is associated with a lifecycle stage of the pipeline based on the defect type (e.g., the lifecycle stage ID 116 of the synthetic data sets 112 of FIG. 1). In some examples, the synthetic data set is generated based on converting or otherwise transforming the data of the real data set as described above with respect to FIG. 3.

At 508, if there is at least one real data set of the plurality of real data sets remaining, the process returns to 504 and another real data set that has not been selected is selected. As a result, a synthetic data set is generated at 506 for the selected defect type for each real data set of the plurality of real data sets. Alternatively, if there are no real data sets remaining that have not been selected, the process proceeds to 510.

At 510, if there is at least one defect type of the plurality of defect types that has not been selected, the process returns to 502 and another defect type that has not been selected is selected. As a result, for each defect type in the plurality of defect types, a synthetic data set is generated at 506 for each real data set in the plurality of real data sets. Alternatively, if there are no remaining defect types to be selected, the process proceeds to 512. In some examples, when the process proceeds to 512, a synthetic data set has been generated for each combination of a defect type of the plurality of defect types and a real data set of the plurality of real data sets.

At 512, a synthetic data set of the plurality of synthetic data sets is selected. The plurality of synthetic data sets includes the synthetic data sets generated at 506 as described above. At 514, a model is trained using a baseline version of the pipeline, or the baseline pipeline, and the selected synthetic data set. At 516, baseline performance metrics are collected from the trained model. Additionally, or alternatively, baseline performance metrics may be collected from the baseline pipeline during the training process of the model. The collected baseline performance metrics are associated with the selected synthetic data set and, through that association, the collected baseline performance metrics are associated with the defect type and real data set with which the selected synthetic data set was generated. In some examples, the baseline performance metrics are also associated with a lifecycle stage of the pipeline based on the lifecycle stage with which the synthetic data set is associated (e.g., the lifecycle stage ID 116 of the synthetic data sets 112 of FIG. 1).

At 518, if there is at least one synthetic data set of the plurality of synthetic data sets that has not been selected, the process returns to 512 and another synthetic data set that has not been selected is selected. As a result, models are trained using the baseline pipeline and each synthetic data set of the plurality of synthetic data sets to form a plurality of trained baseline models and baseline performance metrics are collected from each of the trained baseline models of the plurality of trained baseline models. Alternatively, at 518, if there are no synthetic data sets of the plurality synthetic data sets that have not been selected, the process proceeds to 520.

Starting at 520, the method 500 describes the generation of test models and associated test performance metrics. In some examples, the process starting at 520 may not occur immediately after 518, but rather it may occur only when a change is made to the pipeline that is to be tested as described herein. So, if the baseline version of the pipeline is maintained as the most recent version, the method 500 may be paused or otherwise wait for changes to be made to the pipeline.

When a change has been made to the pipeline, at 520, a synthetic data set of the plurality of synthetic data sets is selected. At 522, a model is trained using a test version of the pipeline which incorporates the change to the pipeline, or the test pipeline, and the selected synthetic data set. At 524, test performance metrics are collected from the trained model. Additionally, or alternatively, test performance metrics may be collected from the test pipeline during the training process of the model. The collected test performance metrics are associated with the selected synthetic data set and, through that association, the collected test performance metrics are associated with the defect type and real data set with which the selected synthetic data set was generated. In some examples, the test performance metrics are also associated with a lifecycle stage of the pipeline based on the lifecycle stage with which the synthetic data set is associated (e.g., the lifecycle stage ID 116 of the synthetic data sets 112 of FIG. 1).

At 526, if there is at least one synthetic data set of the plurality of synthetic data sets that has not been selected for the collection of test performance metrics, the process returns to 520 and another synthetic data set that has not been selected is selected. As a result, models are trained using the test pipeline and each synthetic data set of the plurality of synthetic data sets to form a plurality of trained test models and test performance metrics are collected from each of the trained test models of the plurality of trained test models. Alternatively, at 526, if there are no synthetic data sets of the plurality synthetic data sets that have not been selected, the process proceeds to 528.

At 528, the baseline performance metrics are compared to the test performance metrics for each of the synthetic data sets, with baseline performance metric values being compared to equivalent test performance metric values. In some examples, comparing baseline performance metrics to test performance metrics includes calculating a difference between the baseline performance metrics and test performance metrics and comparing the difference to a defined threshold. If the difference exceeds the threshold and the test performance metrics are worse than the baseline performance metrics, it can be concluded or determined that a defect of the defect type associated with the performance metrics is present in the test pipeline.

At 530, when all the baseline performance metrics and test performance metrics have been compared, defects associated with one or more defect types of the plurality of defect types may have been detected based on the comparison and are identified as described herein. For each detected defect, defect indicators are provided at 532, which include defect type and lifecycle stage data. As a result, observers and/or consumers of the defect indicators (e.g., users of the system, other applications or components of the system configured to initiate defect correction processes) are enabled to target specific lifecycle stages of the pipeline and to seek out specific patterns or features of those stages that may be associated with the defect types in order to take corrective measures to eliminate or otherwise reduce the effects of the detected defects.

In some examples, portions of the method 500 may be performed in parallel or otherwise at substantially the same time without departing from the description. For instance, once some synthetic data sets have been generated at 502-510, those synthetic data sets may be used at 512-518 to train baseline models and collect baseline performance metrics while other synthetic data sets are still being generated at 502-510. Similarly, performance metrics may be compared, and defects detected at 528-530 for some test performance metrics while other test performance metrics are still being collected at 520-526. Other arrangements of subparts of method 500 may also be used in other examples without departing from the description.

Further, it should be understood that, in some examples (e.g., an example where only one real data set is used), for a plurality of defect types, each generated synthetic data set is associated with a different defect type of the plurality of defect types. Alternatively, or additionally, each defect type of the plurality of defect types may be associated with at least one synthetic data set of the total set of generated synthetic data sets, such that each defect type is detectable based on at least one synthetic data set.

Additional Example Scenarios

Aspects of the disclosure enable various additional scenarios, such as next described.

In an example, a model training pipeline is configured to train models in a healthy baseline state. The model pipeline includes four real data sets for use as training data and a user of the pipeline has defined four different defect types that may commonly be introduced when changes are made to the pipeline. Each of the four defect types is associated with a different data feature of training data. The pipeline is configured with data set converters for each of the defect types that are applied to each of the real data sets to generate synthetic data sets that include the data features with which the defect types are associated. As a result, a synthetic data set is generated for each pair of a defect type and a real data set, resulting in sixteen synthetic data sets.

The model training pipeline is then used to train a baseline model using each of the synthetic data sets. The trained baseline models are then tested for performance and baseline performance metrics for each of the associated synthetic data sets are collected. These baseline performance metrics are stored for use in identifying defects that may be introduced when changes are made to the pipeline.

Later, a change to the pipeline is proposed and, as a result, the testing process of that change is initiated. First, a test version of the pipeline that reflects the change is created. Then, as with the baseline models, test models are trained using the test version of the pipeline and each of the synthetic data sets, and test performance metrics are collected based on each of the test models.

The test performance metrics and the baseline performance metrics are compared to each other and, based on identifying a test performance metric associated with one of the synthetic data sets that is worse than the equivalent baseline performance metric, a defect of the defect type with which the synthetic data set is associated is considered to be possible. Similarly, the performance metrics associated with another synthetic data set that is also associated with the defect type provide a similar result, strengthening the likelihood that a defect of the defect type has been introduced by the change.

An indicator of the detected defect is provided to a user of the pipeline system. The indicator shows the user what the defect type is and a lifecycle stage of the pipeline in which the defect was introduced. The user is enabled to immediately begin the process of identifying the cause of the defect and correcting the defect by focusing on the identified lifecycle stage, rather than reviewing the entire pipeline for issues. Further, the defect type information may provide the user context information that enables the user to further zero in on the possible cause of the defect.

Exemplary Operating Environment

Figure 6:
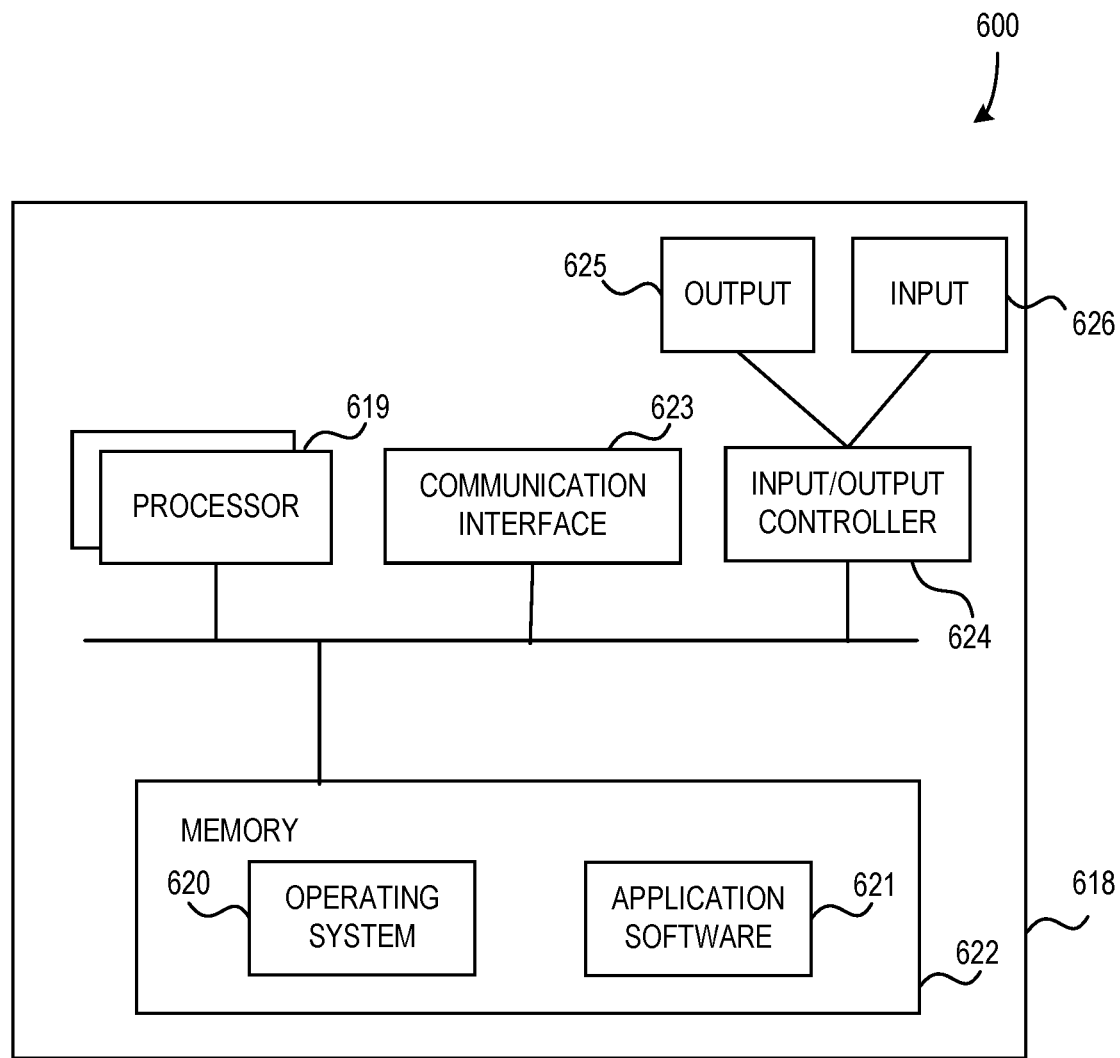
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, generating synthetic data sets and detecting defects introduced in a model training pipeline based on those synthetic data sets as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device (s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for managing defects in a model training pipeline comprises: at least one processor; and at least one memory comprising computer program code, the at least one memory and the computer program code configured to, with the at least one processor, cause the at least one processor to: generate a plurality of synthetic data sets, wherein each synthetic data set of the plurality of synthetic data sets is associated with a defect type of a plurality of defect types and an associated lifecycle stage of a plurality of lifecycle stages in the model training pipeline; generate baseline performance metrics based on each synthetic data set of the plurality of synthetic data sets and associated with each defect type of the plurality of defect types; based on a code change being made to the model training pipeline, train a plurality of test models using the model training pipeline and the plurality of synthetic data sets, wherein a test model of the plurality of test models is trained for each synthetic data set of the plurality of synthetic data sets; based on the training of the plurality of test models using the model training pipeline, collect test performance metrics based on each test model of the plurality of test models and associated with each defect type of the plurality of defect types; based on comparing the baseline performance metrics to the test performance metrics, identify at least one defect of at least one defect type of the plurality of defect types in the model training pipeline; and provide at least one indicator of the identified at least one defect, wherein each indicator of the at least one indicator includes the defect type and the lifecycle stage with which the defect of the indicator is associated, whereby a defect correction process is enabled to remedy the at least one defect based on the associated defect type and lifecycle stage.

A computerized method for managing defects in a model training pipeline comprises: generating, by a processor, a synthetic data set, wherein the synthetic data set is associated with a defect type and a lifecycle stage in the model training pipeline; generating, by the processor, baseline performance metrics associated with the defect type based on the generated synthetic data set; based on a code change being made to the model training pipeline, training a test model, by the processor, using the model training pipeline and the generated synthetic data set; based on the training of the test model using the model training pipeline, collecting, by the processor, test performance metrics based on the test model and associated with the defect type; based on comparing the baseline performance metrics to the test performance metrics, identifying, by the processor, a defect of the defect type in the model training pipeline; and providing, by the processor, an indicator of the identified defect including the defect type and the lifecycle stage with which the generated synthetic data set is associated, whereby a defect correction process is enabled to remedy the identified defect based on the associated defect type and the lifecycle stage.

One or more computer storage media have computer-executable instructions for managing defects in a model training pipeline that, upon execution by a processor, cause the processor to at least: generate a plurality of synthetic data sets, wherein each synthetic data set of the plurality of synthetic data sets is associated with a defect type of a plurality of defect types and an associated lifecycle stage of a plurality of lifecycle stages in the model training pipeline; generate baseline performance metrics based on each synthetic data set of the plurality of synthetic data sets and associated with each defect type of the plurality of defect types; based on a code change being made to the model training pipeline, train a plurality of test models using the model training pipeline and the plurality of synthetic data sets, wherein a test model of the plurality of test models is trained for each synthetic data set of the plurality of synthetic data sets; based on the training of the plurality of test models using the model training pipeline, collect test performance metrics based on each test model of the plurality of test models and associated with each defect type of the plurality of defect types; based on comparing the baseline performance metrics to the test performance metrics, identify at least one defect of at least one defect type of the plurality of defect types in the model training pipeline; and provide at least one indicator of the identified at least one defect, wherein each indicator of the at least one indicator includes the defect type and the lifecycle stage with which the defect of the indicator is associated, whereby a defect correction process is enabled to remedy the indicated at least one defect based on the associated defect type and lifecycle stage.

Alternatively, or in addition to the other examples described herein, examples include any combination of the following:
   wherein generating the baseline performance metrics associated with the defect type based on the generated synthetic data set includes: training a baseline model, by the processor, using a baseline version of the model training pipeline and the generated synthetic data set; and based on the training of the baseline model using the model training pipeline, collecting, by the processor, the baseline performance metrics using on the baseline model, wherein the collected baseline performance metrics are associated with the defect type and lifecycle stage of the generated synthetic data set.
   wherein the baseline performance metrics include a baseline model accuracy percentage and the test performance metrics include a test model accuracy percentage; wherein comparing the baseline performance metrics and the test performance metrics includes comparing a difference between the baseline model accuracy percentage and the test model accuracy percentage to a threshold value; and wherein identifying the defect of the defect type in the model training pipeline is further based on the difference between the baseline model accuracy percentage and the test model accuracy percentage exceeding the threshold value and the test model accuracy percentage being less than the baseline model accuracy percentage.
   wherein generating the synthetic data set includes transforming a real data set to include a data pattern associated with the defect type, whereby a defect of the defect type in the model training pipeline causes performance of models trained using the model training pipeline and the transformed data set with the data pattern to degrade from the baseline performance metrics.
   wherein the lifecycle stage with which the synthetic data set is associated includes at least one of a data quality stage, a featurization stage, a sampling stage, or a model training stage.
   wherein the defect type with which the synthetic data set is associated includes at least one of an imputation defect type, an outlier handling defect type, a featurization defect type, a skewed predictor defect type, a stratified sample defect type, or a machine learning algorithm-specific defect type.
   further comprising: based on comparing the baseline performance metrics to the test performance metrics and the test performance metrics exceeding the baseline performance metrics, providing an indication that the code change improves the model training pipeline with respect to the defect type, whereby a baseline version of the model training pipeline is updated to include the code change and the baseline performance metrics are updated based on the test performance metrics.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for generating, by a processor, a synthetic data set, wherein the synthetic data set is associated with a defect type and a lifecycle stage in the model training pipeline; an exemplary means for generating, by the processor, baseline performance metrics associated with the defect type based on the generated synthetic data set; based on a code change being made to the model training pipeline, an exemplary means for training a test model, by the processor, using the model training pipeline and the generated synthetic data set; based on the training of the test model using the model training pipeline, an exemplary means for collecting, by the processor, test performance metrics based on the test model and associated with the defect type; based on comparing the baseline performance metrics to the test performance metrics, an exemplary means for identifying, by the processor, a defect of the defect type in the model training pipeline; and an exemplary means for providing, by the processor, an indicator of the identified defect including the defect type and the lifecycle stage with which the generated synthetic data set is associated, whereby a defect correction process is enabled that is targeted at the defect type and the lifecycle stage.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing a defect in a model training pipeline, the system comprising:
    a processor; and
    a memory comprising computer program code, the memory and the computer program code configured to, with the processor, cause the processor to:
        generate a plurality of synthetic data sets, wherein each synthetic data set of the plurality of synthetic data sets is associated with a defect type of a plurality of defect types and an associated lifecycle stage of a plurality of lifecycle stages in the model training pipeline;
        generate baseline performance metrics based on each synthetic data set of the plurality of synthetic data sets, wherein each baseline performance metric is associated with a defect type of the plurality of defect types;
        based on a code change being made to the model training pipeline, train a plurality of test models using the model training pipeline and the plurality of synthetic data sets,
        wherein a test model of the plurality of test models is trained for each synthetic data set of the plurality of synthetic data sets; and
        based on comparing the baseline performance metrics to test performance metrics, identify at least one defect of at least one defect type of the plurality of defect types in the model training pipeline.

2. The system of claim 1, wherein generating the baseline performance metrics based on each synthetic data set of the plurality of synthetic data sets includes, for each synthetic data set of the plurality of synthetic data sets:
    training a baseline model using a baseline version of the model training pipeline and the synthetic data set of the plurality of synthetic data sets; and
    based on the training of the baseline model using the model training pipeline, collecting the baseline performance metrics using the baseline model, wherein the collected baseline performance metrics are associated with the defect type of the synthetic data set and lifecycle stage of the synthetic data set.

3. The system of claim 2, wherein the baseline performance metrics include a baseline model accuracy percentage for each baseline model and the test performance metrics include a test model accuracy percentage for each test model of the plurality of test models;
    wherein comparing the baseline performance metrics and the test performance metrics includes comparing a difference between the baseline model accuracy percentage and the test model accuracy percentage to a threshold value for each test model of the plurality of test models; and
    wherein identifying that at least one defect of the at least one defect type is present in the model training pipeline is further based on the difference between the baseline model accuracy percentage and the test model accuracy percentage exceeding the threshold value and the test model accuracy percentage being less than the baseline model accuracy percentage for at least one test model of the plurality of test models.

4. The system of claim 1, wherein generating the plurality of synthetic data sets includes, for each defect type of the plurality of defect types, transforming each real data set of a plurality of real data sets to include a data pattern associated with the defect type, whereby a defect of the defect type in the model training pipeline causes performance of models trained using the model training pipeline and the transformed real data set with the data pattern to degrade from the baseline performance metrics.

5. The system of claim 1, wherein the plurality of defect types include at least one of an imputation defect type, an outlier handling defect type, a featurization defect type, a skewed predictor defect type, a stratified sample defect type, or a machine learning algorithm-specific defect type.

6. The system of claim 1, wherein the memory and the computer program code are configured to, with the processor, further cause the processor to:
    based on comparing the baseline performance metrics to the test performance metrics and the test performance metrics exceeding the baseline performance metrics, provide an indication that the code change improves the model training pipeline with respect to at least one defect type of the plurality of defect types, whereby a baseline version of the model training pipeline is updated to include the code change and the baseline performance metrics are updated based on the test performance metrics.

7. The system of claim 1, wherein the memory and the computer program code are configured to, with the processor, further cause the processor to:

provide an indicator of the identified at least one defect, wherein the indicator includes the defect type of the defect of the indicator and the lifecycle stage with which the defect of the indicator is associated, whereby a defect correction process is enabled to remedy the at least one defect based on the associated defect type and lifecycle stage.

8. The system of claim 1, wherein the test performance metrics are associated with each defect type of the plurality of defect types based on each corresponding test model of the plurality of test models.

9. A computerized method for managing a defect in a model training pipeline, the computerized method comprising:

generating, by a processor, a synthetic data set, wherein the synthetic data set is associated with a defect type and a lifecycle stage in the model training pipeline;

generating, by the processor, baseline performance metrics based on the generated synthetic data set, wherein the baseline performance metrics are associated with the defect type;

based on a code change being made to the model training pipeline, training a test model, by the processor, using the model training pipeline and the generated synthetic data set; and based on comparing the baseline performance metrics to test performance metrics, identifying, by the processor, a defect of the defect type in the model training pipeline.

10. The computerized method of claim 9, wherein generating the baseline performance metrics based on the generated synthetic data set includes:

training a baseline model, by the processor, using a baseline version of the model training pipeline and the generated synthetic data set; and based on the training of the baseline model using the model training pipeline, collecting, by the processor, the baseline performance metrics using on the baseline model, wherein the collected baseline performance metrics are associated with the defect type and lifecycle stage of the generated synthetic data set.

11. The computerized method of claim 10, wherein the baseline performance metrics include a baseline model accuracy percentage and the test performance metrics include a test model accuracy percentage;

wherein comparing the baseline performance metrics and the test performance metrics includes comparing a difference between the baseline model accuracy percentage and the test model accuracy percentage to a threshold value; and wherein identifying the defect of the defect type in the model training pipeline is further based on the difference between the baseline model accuracy percentage and the test model accuracy percentage exceeding the threshold value and the test model accuracy percentage being less than the baseline model accuracy percentage.

12. The computerized method of claim 9, wherein generating the synthetic data set includes transforming a real data set to include a data pattern associated with the defect type, whereby a defect of the defect type in the model training pipeline causes performance of models trained using the model training pipeline and the transformed real data set with the data pattern to degrade from the baseline performance metrics.

13. The computerized method of claim 9, wherein the lifecycle stage with which the synthetic data set is associated includes at least one of a data quality stage, a featurization stage, a sampling stage, or a model training stage.

14. The computerized method of claim 9, the computerized method further comprising:

based on comparing the baseline performance metrics to the test performance metrics and the test performance metrics exceeding the baseline performance metrics, providing an indication that the code change improves the model training pipeline with respect to the defect type, whereby a baseline version of the model training pipeline is updated to include the code change and the baseline performance metrics are updated based on the test performance metrics.

15. The computerized method of claim 9, wherein the test performance metrics are associated with the defect type based on the test model.

16. The computerized method of claim 9, the computerized method further comprising:

providing, by the processor, an indicator of the identified defect including the defect type and the lifecycle stage with which the generated synthetic data set is associated, whereby a defect correction process is enabled to remedy the identified defect based on the associated defect type and the lifecycle stage.

17. A computer storage medium having computer-executable instructions for managing defects in a model training pipeline that, upon execution by a processor, cause the processor to at least:

generate a plurality of synthetic data sets, wherein each synthetic data set of the plurality of synthetic data sets is associated with a defect type of a plurality of defect types and an associated lifecycle stage of a plurality of lifecycle stages in the model training pipeline;

generate baseline performance metrics based on each synthetic data set of the plurality of synthetic data sets, wherein each baseline performance metric is associated with a defect type of the plurality of defect types;

based on a code change being made to the model training pipeline, train a plurality of test models using the model training pipeline and the plurality of synthetic data sets, wherein a test model of the plurality of test models is trained for each synthetic data set of the plurality of synthetic data sets;

based on the training of the plurality of test models using the model training pipeline, collect test performance metrics that are associated with each defect type of the plurality of defect types based on each corresponding test model of the plurality of test models;

based on comparing the baseline performance metrics to the test performance metrics, identify at least one defect of at least one defect type of the plurality of defect types in the model training pipeline; and provide an indicator of the identified at least one defect, wherein the indicator includes the defect type of the defect of the indicator and the lifecycle stage with which the defect of the indicator is associated, whereby a defect correction process is enabled to remedy the indicated at least one defect based on the associated defect type and lifecycle stage.

18. The computer storage medium of claim 17, wherein generating the baseline performance metrics based on each synthetic data set of the plurality of synthetic data sets includes, for each synthetic data set of the plurality of synthetic data sets:

training a baseline model using a baseline version of the model training pipeline and the synthetic data set of the plurality of synthetic data sets; and based on the training of the baseline model using the model training pipeline, collecting the baseline performance metrics using the baseline model, wherein the collected baseline performance metrics are associated with the defect type of the synthetic data set and lifecycle stage of the synthetic data set.

19. The computer storage medium of claim 18, wherein the baseline performance metrics include a baseline model accuracy percentage for each baseline model and the test performance metrics include a test model accuracy percentage for each test model of the plurality of test models;

wherein comparing the baseline performance metrics and the test performance metrics includes comparing a difference between the baseline model accuracy percentage and the test model accuracy percentage to a threshold value for each test model of the plurality of test models; and wherein identifying that at least one defect of the at least one defect type is present in the model training pipeline is further based on the difference between the baseline model accuracy percentage and the test model accuracy percentage exceeding the threshold value and the test model accuracy percentage being less than the baseline model accuracy percentage for at least one test model of the plurality of test models.

20. The computer storage medium of claim 17, wherein generating the plurality of synthetic data sets includes, for each defect type of the plurality of defect types, transforming each real data set of a plurality of real data sets to include a data pattern associated with the defect type, whereby a defect of the defect type in the model training pipeline causes performance of models trained using the model training pipeline and the transformed real data set with the data pattern to degrade from the baseline performance metrics.

* * * * *